United States Patent [19]
Suzuki

[11] Patent Number: 5,272,547
[45] Date of Patent: Dec. 21, 1993

[54] VIDEO IMAGE READING APPARATUS

[75] Inventor: Kiyosuke Suzuki, Kanagawa, Japan

[73] Assignee: Sony Corporation, Japan

[21] Appl. No.: 679,423

[22] Filed: Apr. 2, 1991

[30] Foreign Application Priority Data

Apr. 26, 1990 [JP] Japan ................ 108754

[51] Int. Cl.⁵ .................... H04N 7/06; H04N 1/40
[52] U.S. Cl. ............................ 358/479; 358/140
[58] Field of Search ............ 358/140, 166, 456, 457, 358/458, 471, 479, 160, 461, 462, 463, 464, 465, 466

[56] References Cited

U.S. PATENT DOCUMENTS 4,764,870  8/1988  Haskin ....................... 358/140
5,012,353  4/1991  Yoshino et al. ............. 358/401

FOREIGN PATENT DOCUMENTS 0310021  4/1989  European Pat. Off. .

Primary Examiner—Edward L. Coles, Sr.
Assistant Examiner—Jerome Grant, II
Attorney, Agent, or Firm—Ronald P. Kananen

[57] ABSTRACT

A video image reading apparatus stores video data from a reader of the video image of an original document and outputs the stored video signals as a standard television video signal by successively reading the video signals from the video memory in a timing relationship complying with a given standard television format. The present invention makes it possible to reduce the storage capacity of the video memory by comparing the lower-order bits of the video data from the video image reader with a reference data which cyclically changes and by adding a result of comparison to the higher-order bits to store the sum to the video memory.

6 Claims, 1 Drawing Sheet

VIDEO IMAGE READING APPARATUS

FIELD OF THE INVENTION

The present invention relates to an video image reading apparatus and, in particular, to a video image reading apparatus which is adapted to output video image data read by video image reading means as a video signal for CRT (cathod ray tube) display means and the like.

DESCRIPTION OF THE PRIOR ART

As a prior art video image reading apparatus, a scanning apparatus which outputs digital video data obtained by reading the video image of an original document by means of a video image sensor such as CCD via a digital interface such as SCSI, GPIB and the like has been known. In order to output the read video image in a visual representation (print out, monitoring display and the like), interfacing of a computer and the like is necessary and the whole system becomes larger and the response is relatively slow since the signal processing requires a long period of time. Therefore, the prior art video reading apparatus such as scanning device is not suitable for presentation and the like, for example in exhibitions and lectures.

The present assignee has proposed a video image reading apparatus which stores video data obtained by reading the video image of an original document, repeatedly reading the stored data from the video memory in synchronization with the horizontal and vertical scanning signals of, for example, a so-called NTSC system television signal for outputting it as a video signal for still display. This video image reading apparatus can transform the video image of an original document into video signals and display it in a short period of time and good response.

However, the video memory requires a relatively large storage capacity. A memory having more capacity is necessary if the resolution is to be increased, the number of display degradations and the display colors should be increased. Hence, reduction in data by some means has been demanded.

Although reduction of the number of the video data is made possible by so-called subsidiary Nyquist sampling, deterioration of the resolution cannot be avoided since decimation sampling of two-dimensional pixels is performed. This approach is not preferable.

SUMMARY OF THE INVENTION

The present invention was made in view of the above-mentioned problems.

It is an object of the present invention to provide a video image reading apparatus which temporarily stores read video data in a video memory and reads and output the stored video data from the memory in timing relationship complying a given television system, which can reduce the storage capacity of the video memory without deterioration of the resolution.

In order to accomplish the above-mentioned object, the present invention provides a video image reading apparatus, comprising; means for reading the video image of an original document; means for dividing a video data from the video image reading means into higher-order bits and lower-order bits; means for comparing the lower-order bits from the bit dividing means with a reference data which cyclically changes; means for adding a data outputted from the comparing means to the higher-order bits from the bit dividing means; video memory for storing output data from the adding means; and means for outputting the video data stored in the video memory as a video signal equivalent to a standard to television signal by successively reading the stored video data in a timing relationship complying a given standard television format.

Higher-order bits corresponding to all pixels of the video data are stored in the video memory. The stored data of the higher-order bits include lower-order bit information.

The video image reading apparatus of the present invention divides the video data into higher-order bits and lower-order bits, compares the lower-order bits with a cyclically changing reference data, adds a result of the comparison to the higher-order bits for storing the sum in the video memory. This causes the amount of data to be stored in the video memory to become substantially half of the conventional amount. Lower-order bit information as well as the lower-order bits of the original video data is represented within a given period of time. Therefore, the memory capacity can be reduced to a half while suppressing a decrease in information content without a lowering of the resolution.

DESCRIPTION OF THE PREFERRED EMBODIMENT

Figure 1:
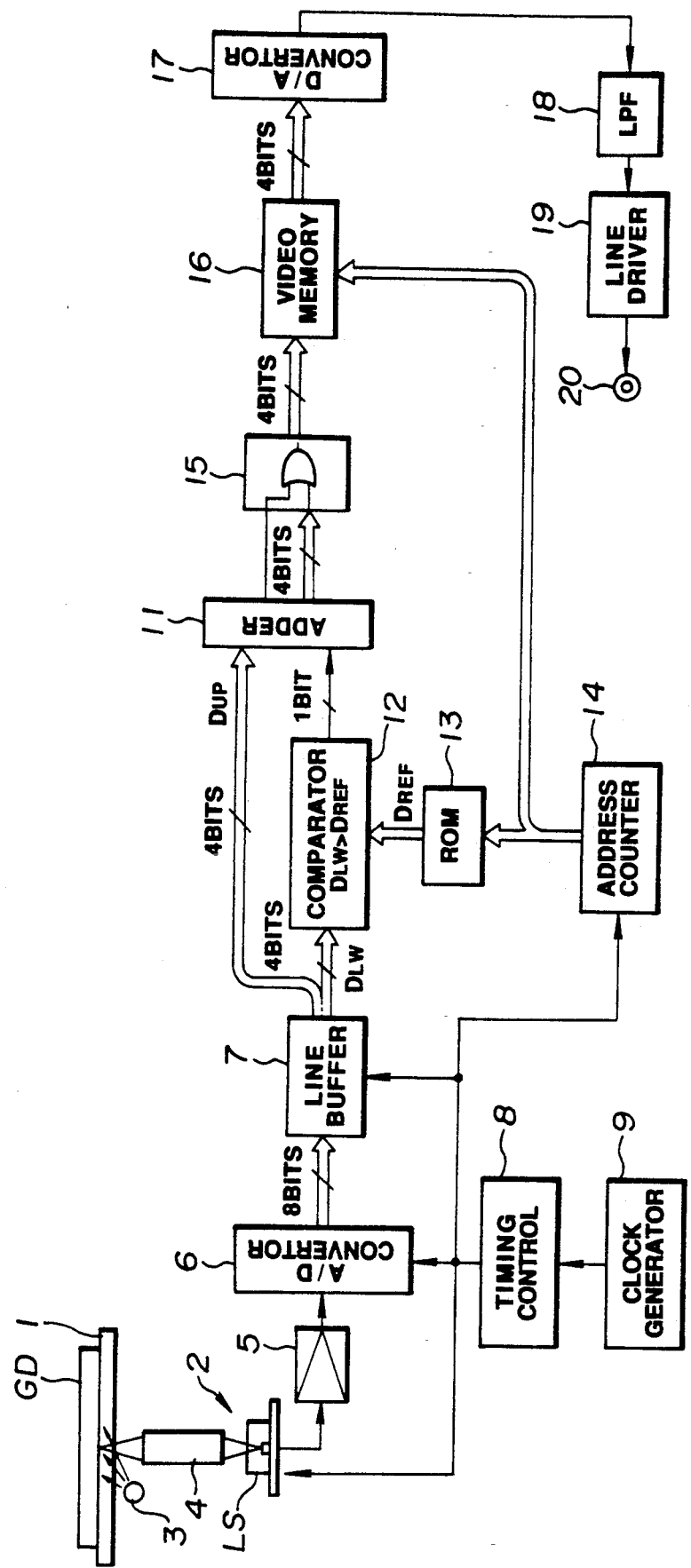
FIG. 1 is a block diagram showing an embodiment of a video image reading apparatus of the present invention.

Referring now to FIG. 1 , there is shown a block diagram for illustrating the principle of basic operation of a video image reading apparatus of the present invention.

In the video image reading apparatus shown in FIG. 1, a video image reading head which reads an image of an original document GD placed on a platen 1 is provided with a light source 3, a multi-lens array 4 and a CCD line sensor LS. The video image original document GD is irradiated with a light from a light source 3. A reflected light from the original document GD is detected by a line sensor LS via the multi-lens array 4. The line sensor LS comprises, for example, 1728 CCD photocells which are linearly arrayed in a main scanning direction. When one line of the video image original document GD in a main scanning direction (vertical direction on a display screen) is read, video signals of three primary colors is line-successively (this line is in a vertical direction of the screen) obtained by causing the light source to successively emit lights corresponding to three primary colors R, G and B. An output signal from the line sensor LS of the video image reading head 2 is amplified by an amplifier 5 and then fed to an A/D converter 6 in which the signal is converted into digital video data having, for example 8 bits per pixel and the converted data are synchronized by a line buffer 7 such as so-called FIFO memory and are outputted. The operation of the line sensor LS, the A/D converter 6 and the line buffer 7 is controlled by a timing control signal from a reading timing control circuit 8, to which a clock signal is supplied from a clock generating circuit 9.

The video data including, for example 8 bits per pixel from the line buffer are divided into higher-order four bits and lower-order four bits. Data $D_{UP}$ including the higher-order four bits and data $D_{LW}$ including the lower-order four bits are fed to an adder 11 and a comparator 12, respectively. The comparator 12 is supplied with reference data $D_{REF}$ from a reference data ROM 13. The reference data $D_{REF}$ cyclically assumes the same values at a given cycle by being accessed according to an address from an address counter 14. Specifically, in case of a four word cycle, four values a, b, c and d are successively repeated as the reference data $D_{REF}$ and cyclically read from the ROM and fed to the comparator 12 at which they are compared with the lower-order four bit data $D_{LW}$ from the line buffer 7. The comparator 12 outputs as a logical value data (one bit bistate data) a result of determination whether or not the lower-order bit data $D_{LW}$ is larger than the reference data $D_{REF}$. That is, the comparator outputs "1" and "0" when $D_{LW} > D_{REF}$ and $D_{LW} \leq D_{REF}$, respectively. This operation can be deemed that the lower-order bit data $D_{LW}$ is quantized into one bit by so-called dither method. An accuracy not less than the accuracy of outputted bits is realized by making the data into a bistate by adding a reference data $D_{REF}$ as a pseudo random number (also referred to as dither pattern) to the inputted lower-order bit data $D_{LW}$. Such a one-bit output data from the comparator 12 is fed to the adder 11 at which it is added to the higher-order four bit data $D_{UP}$.

For simplicity of description, the embodiment will be described assuming that the video data be four bit data and the lower-order data $D_{LW}$ and the reference data $D_{REF}$ be two bits, respectively. The two bit data assumes decimal values such as 0 through 3. Four values are cyclically used in order of 1, 3, 2, 0 at a cycle of four words as the reference data $D_{REF}$ to the comparator 12. The four bit video data assumes decimal values 0 through 15. The detailed example is shown in Table 1. All lower and higher-order data $D_{LW}$ and $D_{UP}$ of the video data, the reference data $D_{REF}$, the output $D_{CP}$ from the comparator 12 and the addition output $D_{AD}$ of the adder 11 are represented by decimal notation.

TABLE 1

| VIDEO DATA | 0 | 1 | 3 | 6 | 8 | 6 | 5 | 7 | 10 | 12 ... |
|---|---|---|---|---|---|---|---|---|---|---|
| $D_{UP}$ | 0 | 0 | 0 | 1 | 2 | 1 | 1 | 1 | 2 | 3 ... |
| $D_{LW}$ | 0 | 1 | 3 | 2 | 0 | 2 | 1 | 3 | 2 | 0 ... |
| $D_{REF}$ | 1 | 3 | 2 | 0 | 1 | 3 | 2 | 0 | 1 | 3 ... |
| $D_{CP}$ | 0 | 0 | 1 | 1 | 0 | 0 | 0 | 1 | 1 | 0 ... |
| $D_{AD}$ | 0 | 0 | 1 | 2 | 2 | 1 | 1 | 2 | 3 | 3 ... |

It is apparent from the table 1 that the output $D_{CP}$ from the comparator 12 is determined from the lower-order two-bit data $D_{LW}$ of the video data and the reference data $D_{REF}$ and is added to the higher-order data $D_{UP}$ of the video data to provide the two-bit addition data $D_{AD}$. The original four-bit data can be bit-compressed into half. Since the number of pixels does not change, no deterioration of the resolution occur. Dynamic range or degradation of the compressed data are also improved in comparison with the case in which the higher two bits are used without compression.

TABLE 2

| VIDEO DATA | 7 | 7 | 7 | 7 | 7 | 7 | 7 | 7 | 7 ... |
|---|---|---|---|---|---|---|---|---|---|
| $D_{UP}$ | 1 | 1 | 1 | 1 | 1 | 1 | 1 | 1 | 1 ... |
| $D_{LW}$ | 3 | 3 | 3 | 3 | 3 | 3 | 3 | 3 | 3 ... |
| $D_{REF}$ | 1 | 3 | 2 | 0 | 1 | 3 | 2 | 0 | 1 ... |
| $D_{CP}$ | 1 | 0 | 1 | 1 | 1 | 0 | 1 | 1 | 1 ... |
| $D_{AD}$ | 2 | 1 | 2 | 2 | 2 | 1 | 2 | 2 | 2 ... |

When the video data assumes an intermediate value of the resolution represented by the higher-order two bits (quantized, steps), for example a decimal number "7," $D_{UP}$ is only a binary that is, a decimal "4." When expanded to four bits and represented by only the use of higher-order two bits, $D_{AD}$ is a binary "2122", that is a decimal, "8848" which is repeatedly represented at a cycle of four words by the addition output $D_{AD}$ which is a two-bit compression data of the present embodiment. The average value of the addition output is "7" so that an intermediate value can be represented. Although the output is five-bits if a carry occurs since addition of four bit data and one bit data is performed by the adder 11 of FIG. 1, the highest-order one bit is used as an over-flow flag in order to make a data to be stored in the memory four bits. The overflow flag and the lower-order four bits which is an output of addition are fed to an overflow processing circuit 15. The overflow processing circuit 15 comprises OR circuits and outputs a four-bit data "1111" which (15 in decimal number) are all "1" in all digits when the over-flow flag assumes "1".

The output of the overflow processing circuit 15 is fed to a video memory 16 such as frame memory and stored therein when a write address is accessed by an address counter 14. In this case, since the photocells of the line sensor LS are arrayed in a vertical direction of a screen, all data corresponding to an entire line are successively written according to horizontal scanning of the line sensor LS in each line in a vertical direction. On reading out of the video memory 16, video data having the signal format which is same as that of television video signal are outputted by addressing in such a manner that scanning is conducted in a vertical direction while repeating horizontal line scanning in accordance with a usual television video signal format. The output video data are converted into analog signals by the D/A convertor 17. After the analog signals are integrated by an LPF 18, the integrated signal is outputted as a video signal similar a usual television signal from an output terminal 20 via a line driver 19. A video signal on which a character pattern and the like is imposed may be outputted if necessary.

What is claimed is:
1. A video image reading apparatus, comprising:
   means for reading the video image of an original document and for generating video image data based upon said read video image;
   means for dividing said video image data from the video image reading means into higher-order bits and lower-order bits;
   means for comparing the lower-order bits from the bit dividing means with a reference data which cyclically changes;
   means for adding said comparison output data outputted from the comparing means to the higher-order bits from the bit dividing means and for generating added output data;
   video memory for storing said added output data from the adding means as output video data; and
   means for outputting the output video data stored in the video memory as a video signal equivalent to a standard television signal by successively reading the stored output video data in a timing relationship complying with a given standard television format;
   wherein said video image data has a first number of bits and said video output data has a second number of bits and wherein said first number if larger than said second number.

2. A video image reading apparatus as defined in claim 1, wherein said video reading means is a line sensor comprising a plurality of photocells arrayed in a main scanning direction relative to the original document, the sensor being moved in a subsidiary scanning direction relative to said original document to read a two-dimensional video image.

3. A video image reading apparatus as defined in claim 1, wherein said comparing means respectively outputs a binary data of either a "1" or "0+ depending upon whether the lower-order bits from said bit dividing means are larger or smaller than the reference data.

4. A video image reading apparatus as defined in claim 1, wherein said reading means, said dividing means, and said video memory all use a common clock generator and said reference data cyclically changes under the timing of said clock generator.

5. A video image reading apparatus as defined in claim 1, wherein said first number of bits comprises 8, said second number of bits comprises 4, and said higher-order bits and said lower-order bits each comprises 4 bits.

6. A video image reading apparatus as defined in claim 1, wherein said adding means further comprises an overflow processing circuit.

* * * * *